INVENTORS
RICHARD B. GORANSON
RICHARD P. JOHNSTON
WILLIAM R. MARTINI
WILLIAM H. McDILL
JACK E. NOBLE
MAURICE A. WHITE

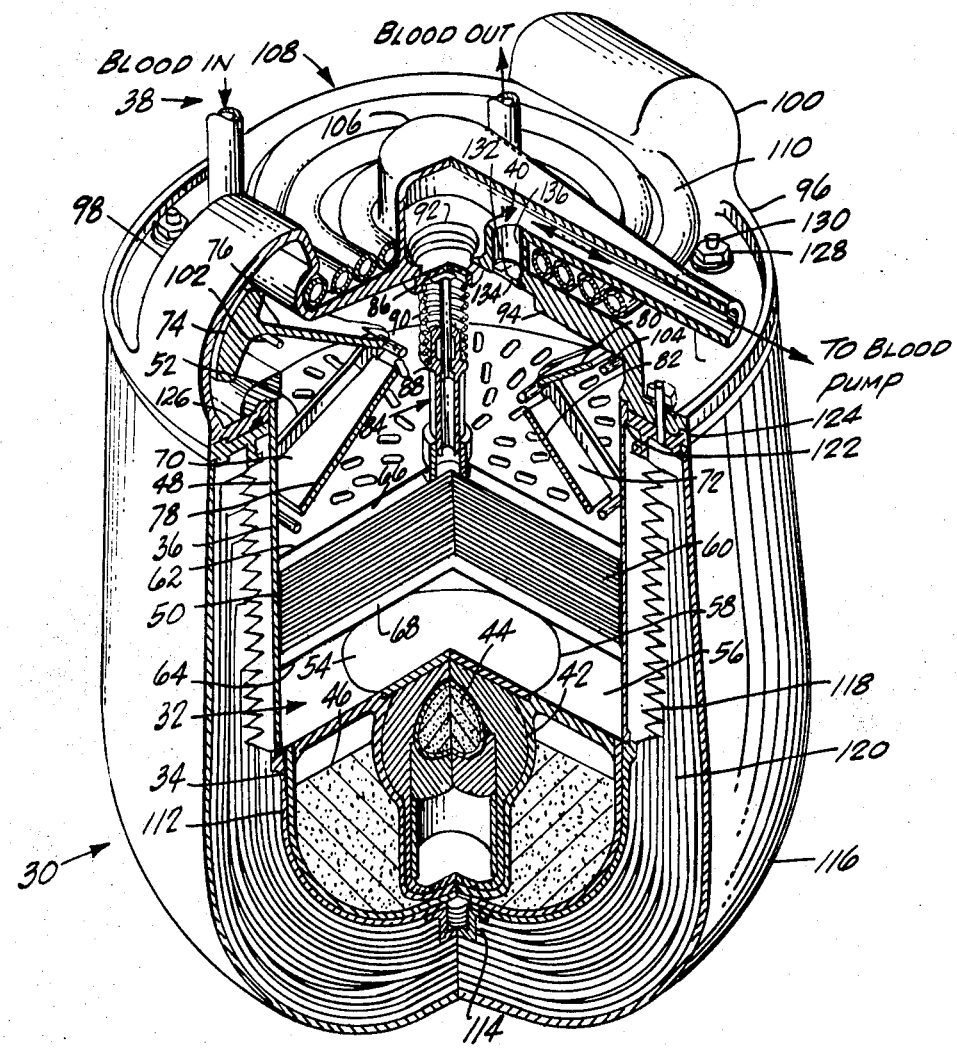

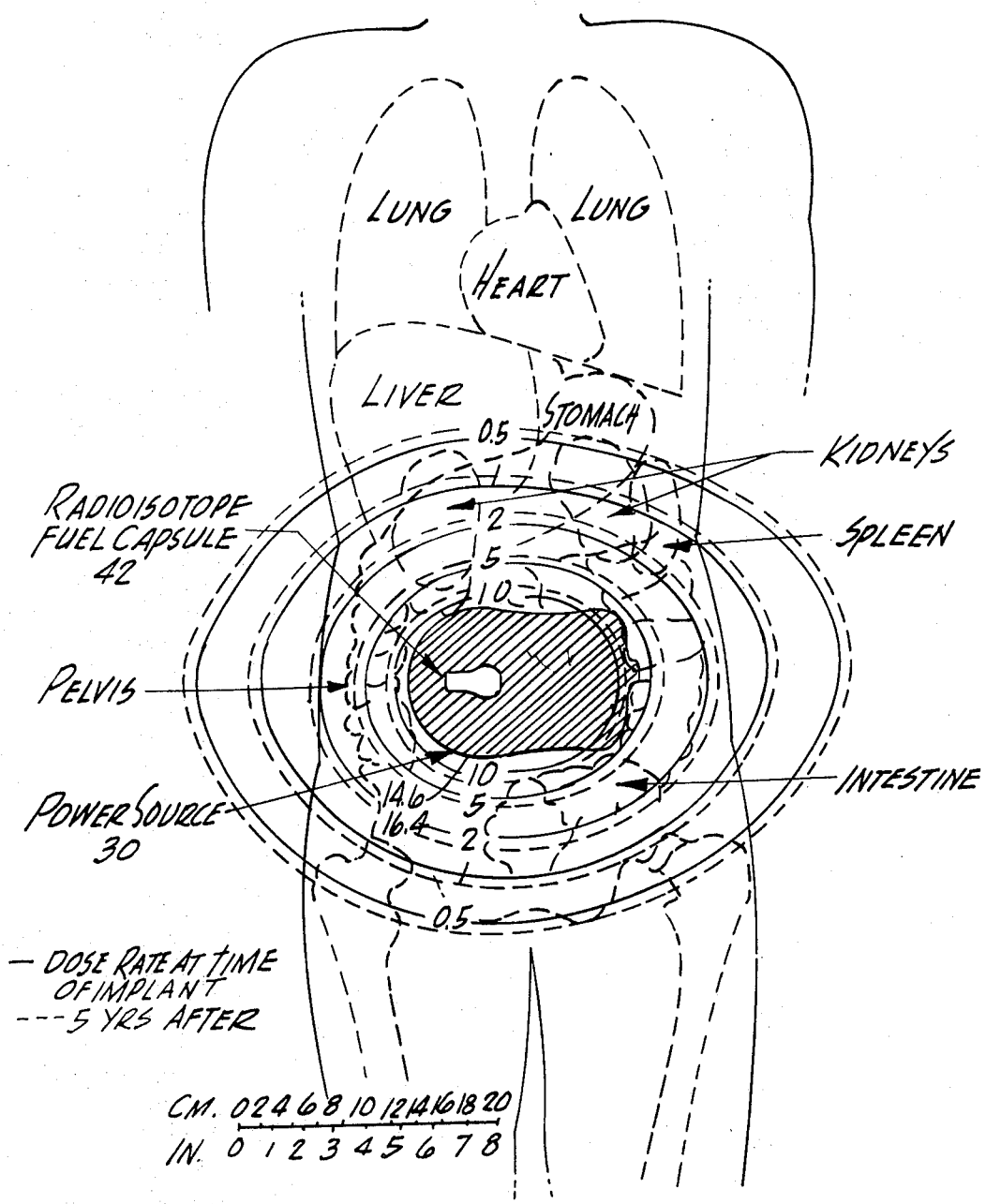

-AGENT-

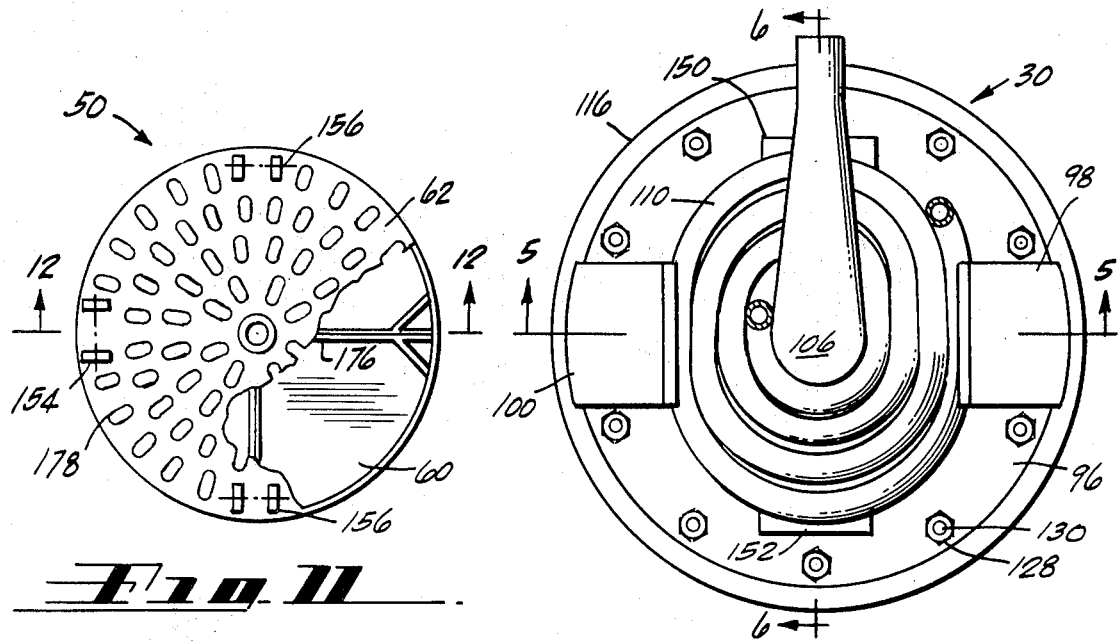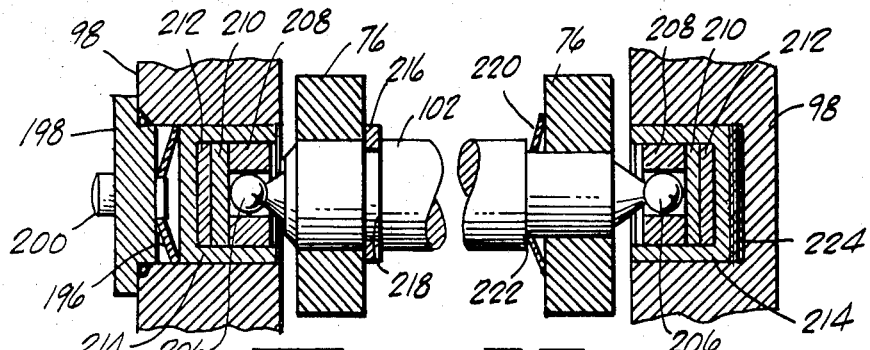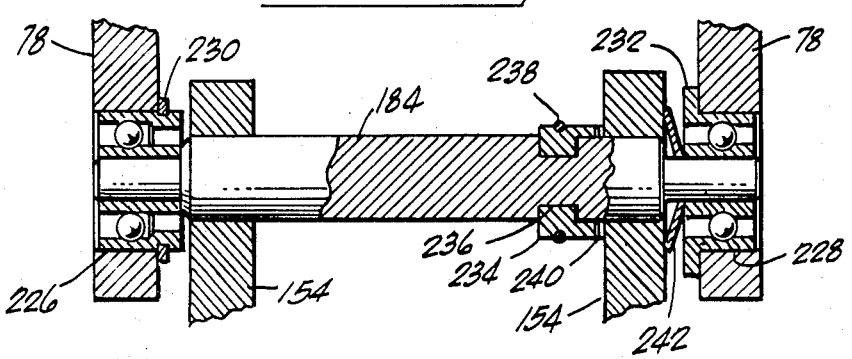

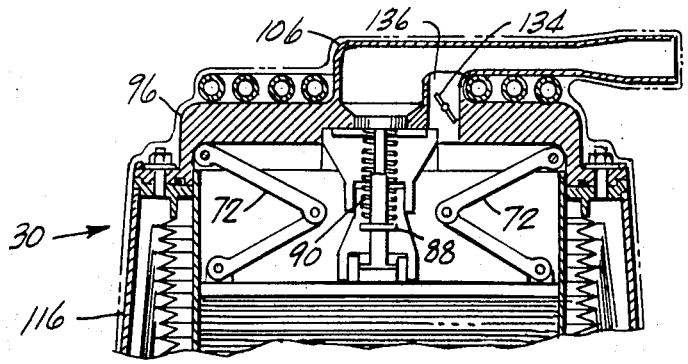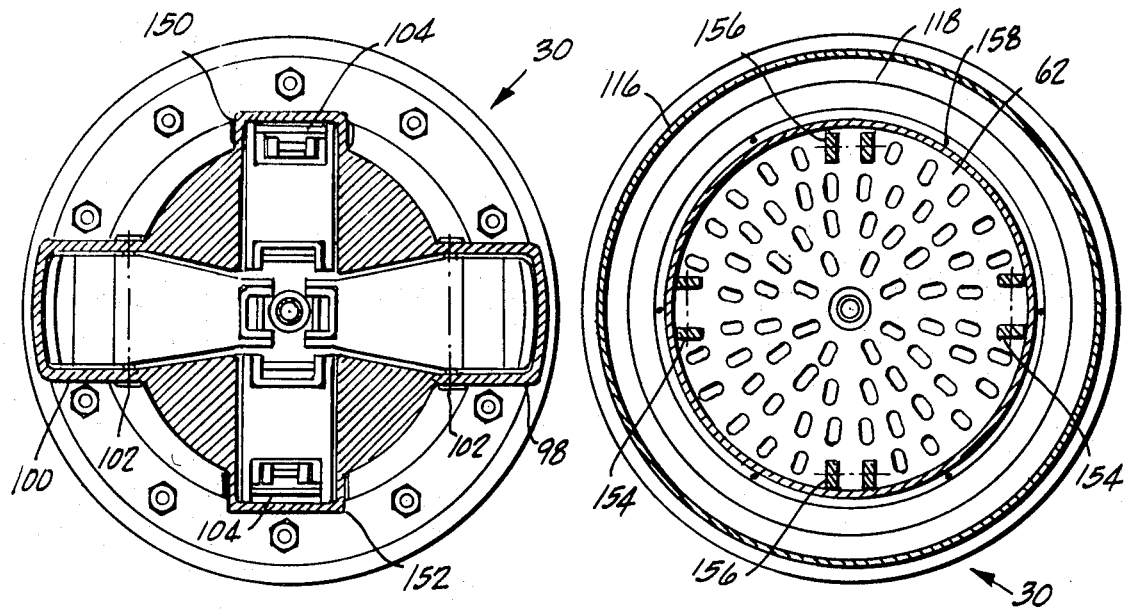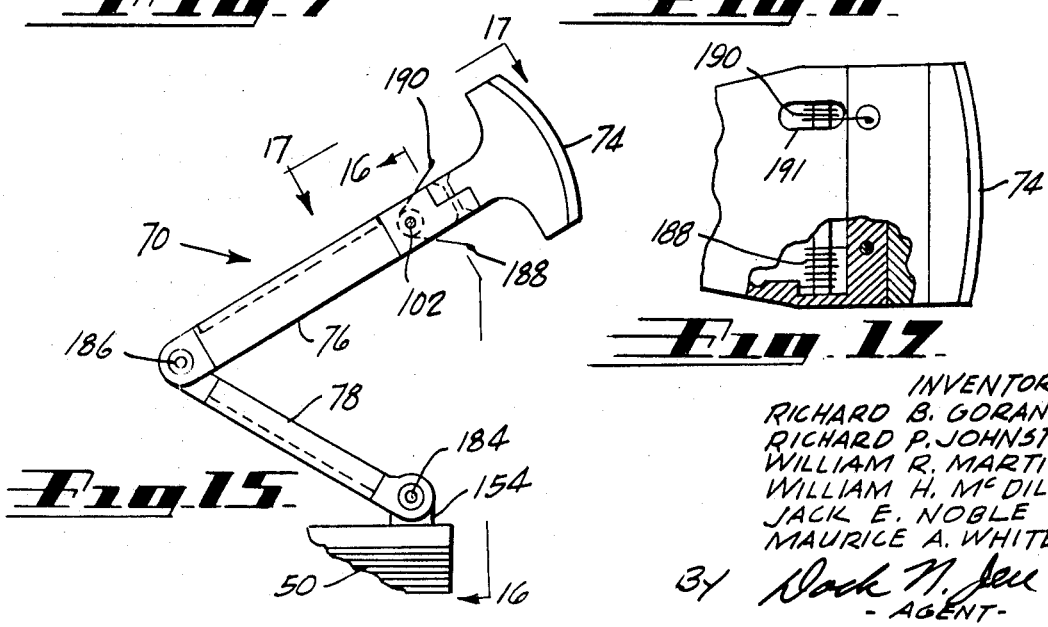

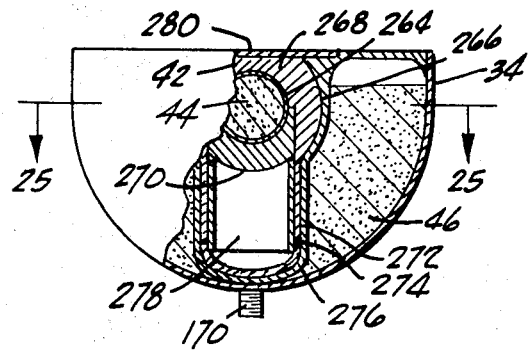
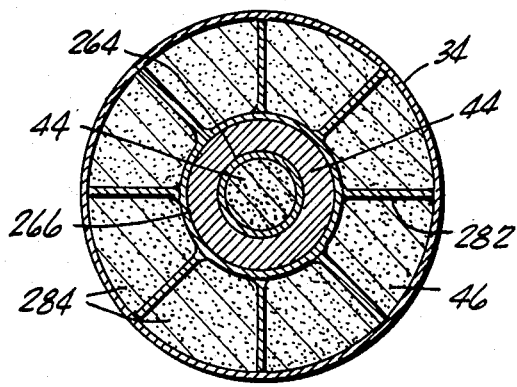
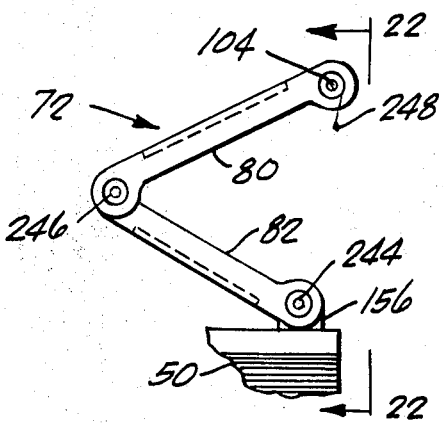
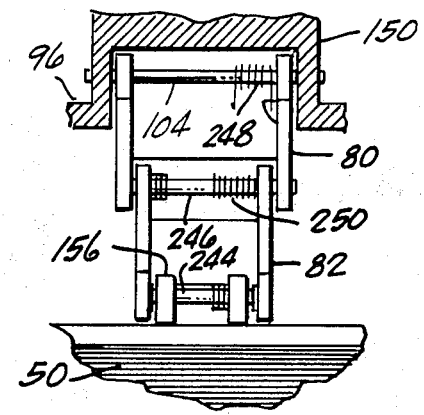
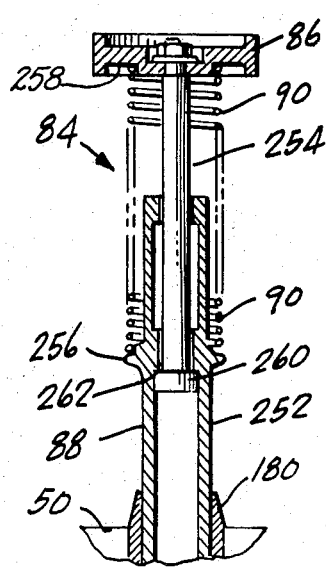
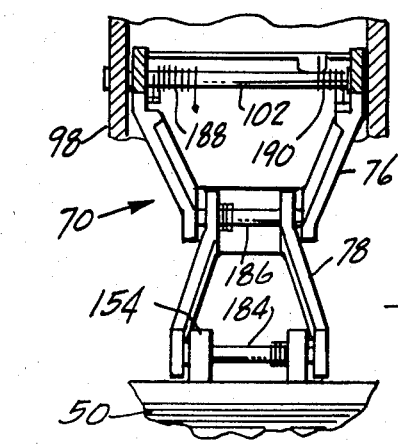
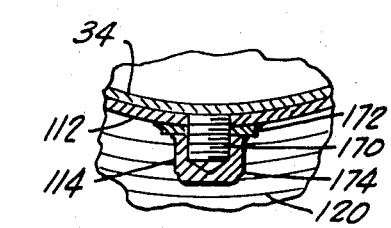

INVENTORS
RICHARD B. GORANSON
RICHARD P. JOHNSTON
WILLIAM R. MARTINI
WILLIAM H. McDILL
JACK E. NOBLE
MAURICE A. WHITE

BY
- AGENT -

United States Patent Office 3,563,028
Patented Feb. 16, 1971

3,563,028
IMPLANTABLE RADIOISOTOPE-FUELED
STIRLING ENGINE
Richard B. Goranson and Richard P. Johnston, Kennewick, William R. Martini, Richland, William H. McDill, Kennewick, Jack E. Noble, Prosser, and Maurice A. White, Kennewick, Wash., assignors to McDonnell Douglas Corporation, a corporation of Maryland
Filed July 22, 1968, Ser. No. 746,601
Int. Cl. F03g 7/06; A61f 1/00
U.S. Cl. 60—24
10 Claims

ABSTRACT OF THE DISCLOSURE

Long-life, radioisotope-fueled, thermal regenerative engine for driving a blood pump is used in a circulatory support unit which is implantable in an animal. Engine includes an encapsulated radioisotopic heat source with a thermal reservoir, a thermodynamic converter, a heat exchanger using blood as the cooling medium, and a control device to regulate engine power output. The converter includes a cylinder containing a regenerator and drive plug assembly suspended from a counterbalanced linkage. The control device includes an adjustable bypass valve which regulates the pressure difference appearing across the plug to control engine speed and, therefore, its power output.

STATEMENT AND CROSS-REFERENCES
TO RELATED APPLICATIONS

The invention described herein was made in the course of, or under, a contract with the U.S. Atomic Energy Commission.

A Stirling cycle thermal machine having a self oscillating regenerator is shown, described and claimed in a copending patent application of Arthur R. Baumgardner, Richard P. Johnston, William R. Martini and Maurice A. White, Ser. No. 702,420 filed on Feb. 1, 1968 for Stirling Cycle Machine With Self Oscillating Regenerator. A Stirling cycle thermal amplifying machine having an independently oscillated regenerator is shown, described and claimed in a copending patent application of William R. Martini, Ser. No. 702,745 filed on Feb. 2, 1968 for Stirling Cycle Amplifying Machine. A pulsatile, passive filling (controlled suction), pump device is shown, described and claimed in a copending patent application of Richard B. Goranson and William R. Martini, Serial No. 705,121 filed on Feb. 13, 1968 for Pulsatile Heart Pump.

BACKGROUND OF THE INVENTION

Our present invention relates generally to the field of thermal regenerative machines and more particularly to a long-life, radioisotope-fueled, Stirling engine. The radioisotope-fueled Stirling engine is especially suited for use in a circulatory support unit which is implantable in an animal or human being.

In an implantable artificial heart unit which is used either as an assist device or total replacement for the heart in an animal or human being, one of the major difficulties involved is the provision of a satisfactory power source in the unit for driving the blood pump thereof. The power source must, for example, be capable of supplying proper and adequate amounts of mechanical output power to drive the blood pump but must not be excessively heavy or large for implanation. Further, the power source must be able to function satisfactorily under reasonably large acceleration loads in any direction and have a sufficiently long lifetime for a wide range of working conditions. It is, of course, apparent that a power source of the highest operating reliability is required. These problems and objectives have been solved and met by this invention.

SUMMARY OF THE INVENTION

Briefly, and in general terms, our invention is preferably accomplished by providing a Stirling cycle engine including an appropriately encapsulated radioisotopic heat source with a thermal storage component therefor, a thermodynamic converter for converting the heat energy into a suitable form of mechanical energy to drive a blood pump, a heat exchanger using circulating blood as the cooling medium to remove waste heat, and a control device for regulating engine power output.

The radioisotopic heat source includes a fuel capsule which can be generally pear-shaped wherein the bulbous (enlarged) portion encloses a $^{238}$PuO$_2$ (plutonium oxide isotope) fuel pellet and the neck (cylindrical) portion encloses a plenum chamber to provide a suitable void for the accumulation of helium generated by the decay of the plutonium. The fuel pellet is preferably in the form of a spherical, 95% T.D. (theoretical density) sintered pellet which has a useful life of at least 5 years before refueling is required. The spherical fuel pellet is in a maximum density form which can be properly shielded at minimum shield weight. Thus, the generally pear-shaped fuel capsule provides the necessary shielding in a minimum weight configuration and yet includes an adequate, integral, helium accumulation void space.

A thermal storage component is provided with the fuel capsule isotope inventory by storing thermal energy during periods of relatively low activity of the animal or human being using an implanted artificial heart unit which includes the Stirling engine, and releasing this energy to the engine during peak demand periods. The thermal storage component is preferably a hemisphere having a central, hollowed-out core to accommodate the pear-shaped fuel capsule therein. The hemisphere has a number of vertical sectional compartments which are substantially filled preferably with LiH (lithium hydride) and circumferentially surround the capsule. The half grapefruit-shaped structure is fully closed on top to protect the fuel capsule from oxidation and to provide a flat, hot, upper surface. The use of a hemispherical storage structure enables the placement of the fuel pellet near the center of the engine and permits the application of a uniform thickness of superinsulation thereto. The hemispherical shape is, of course, also a good configuration for resisting pressure.

This method of storing thermal energy utilizes the latent heat of fusion of a material having an appropriate melting temperature. Besides LiH, other suitable thermal storage materials that can be used include LiF (lithium fluoride) or the eutectic mixture LiF-NaF (lithium fluoride-sodium fluoride) which has certain desirable chemical and physical properties. The high heat of fusion of LiH is the basic reason for its preference as the thermal storage material, although LiH is also the minimum weight material among those which are suitable for use in the thermal storage component. A fail-safe, emergency heat dumping device is provided to limit the temperature of the fuel capsule and thermal storage component.

The output energy requirement is reduced, for example, during the normal sleep period of an animal or person employing the implanted artificial heart unit. It is during this period that the thermal storage material is remelted to absorb the excess heat from the fuel capsule. The LiH material absorbs heat as it melts without increasing in temperature until all of it is liquid. The compartments of the hemispherical storage component are circumferentially separated by vertical webs which extend radially from the capsule retainer core to the hemispherical shell. These webs provide improved transfer of heat throughout the LiH material and, also, strengthen the flat, hot, upper surface of the thermal storage component. The LiH material increases about 20% in volume on melting and the resulting liquid does not tend to pool away from the hot upper surface because of the constrictive effects of the compartment webs.

The thermodynamic converter includes the hot upper surface of the thermal storage component as the hot wall of a cylinder containing a working fluid such as xenon or carbon dioxide. The cylinder houses a regenerator which is supported by a Sarrut's type, counterweighted and spring-augmented linkage system. A cold wall is located at the other end of the cylinder opposite to the hot wall, and the regenerator normally reciprocates axially between the hot and cold walls. The regenerator is preferably disc-shaped, having a peripheral edge which fits closely to the internal (side) surface of the cylinder. The regenerator includes, for example, a sintered gold wire matrix which is generally sandwiched between two orifice plates that are respectively spaced from the axial face surfaces of the matrix. The space between the matrix and each orifice plate serves as a plenum chamber to distribute the gas flow to and from the wire matrix.

The regenerator drive system includes a drive plug assembly which is essentially a disc-shaped drive plug mounted to one end of an axially telescoping structure, the other end of which is secured to the center of the upper orifice plate of the regenerator. The telescoping structure is normally held extended by a rebound compression spring. The cold wall of the cylinder has a central opening or passageway therein which connects the cylinder chamber to a power outlet housing chamber. The drive plug passes through the cold wall opening at about midstroke during a small movement portion of each stroke of the regenerator. The clearance provided by the cold wall opening is small, and the drive plug fits relatively closely to the edges of such opening. After passing through the cold wall opening, the drive plug subsequently engages a stop structure in the upper portion of the output housing. The rebound compression spring mounted on the telescoping structure will be compressed to arrest the motion of the regenerator as it approaches the cold wall in the cylinder. In this way, travel of the drive plug is limited, and the overall length of the Stirling engine is reduced. Rebound torsion spring means can be suitably mounted to the Sarrut's type linkage system to control regenerator travel in the opposite direction.

A small clearance (0.025±0.005 inch, for example) is maintained between the regenerator peripheral edge and the cylinder internal side wall. To avoid full operating pressure across the cylinder, a superalloy (René 41) bellows is provided to encase the (zirconia) cylinder and acts as a secondary containment vessel for the working fluid or gas. The space between the bellows and cylinder external wall also contains working gas. This encased space remains essentially at the nominal (average) working pressure of the Stirling engine, the pressure level being maintained by a very small port extending through the cylinder wall. The port is sufficiently large so that the working gas in the encased space responds to long term pressure level variations, but is small enough to prevent this space from being or acting as dead volume in or on the working chamber. The maximum pressure differential across the cylinder wall is the maximum pressure variation within the cylinder, rather than the maximum absolute pressure. The bellows configuration was used to minimize heat transfer from the hot to cold cylinder end walls by providing a lengthened heat flow path with the corrugations thereof. More importantly, the necessity of maintaining integrity of the cylinder as a leak-proof pressure vessel throughout the life of the engine is thus avoided.

The radioisotopic heat source including its fuel capsule enclosed in the thermal storage component is covered and held in a hemispherical superalloy dome which is attached to the lower ends of the cylinder and its encasing bellows. The temperature along the cylinder wall decreases from the heat source end to the cold wall end where the heat exchanger is located. Heat losses from the cylinder must be kept small to maintain the high efficiency of the Stirling engine and to prevent damage of the tissue around it. An outer housing spaced from the bellows and the dome is provided thereabout, and superinsulation is installed in the space therebetween. A preferred insulation material is a multiple layer insulation requiring highly reflective shields, low conductive fillers to separate the shields, and vacuum therein. Such a material is Linde Super insulation which is a multifoil insulation including alternate layers of opaque metal foils and quartz fibers. This insulation can be formed around highly curved surfaces and still maintain good insulation characteristics. Following application of the laminations to the cylinder (bellows) and dome, the outer housing is installed to protect the insulation.

The outer housing is preferably formed in two halves (of titanium alloy material, for example) which can be joined by welding. A closing bulkhead is affixed to the upper ends of the bellows and outer cylinder to close off the insulation space therebetween. The housing is designed to withstand external pressure without buckling and includes a small tube recessed in the housing so that air can be withdrawn to create a suitable vacuum within the housing to ensure effective insulation. The vacuum is maintained by pinching off the tube and welding the end thereof. A (titanium alloy forging) housing cap which mounts the heat exchanger includes the cold wall for the cylinder and the power outlet housing located above the opening in the cold wall for passage of the regenerator drive plug. The cold wall (surface) is gold plated for emissivity control. The cap is suitably secured to the closing bulkhead and covers the upper open end of the cylinder.

The Stirling engine is most suitably implanted in the upper pelvic area of a person so that it can be conveniently anchored to the iliac crest or a portion of the ilium. The mobility and compressibility of the large and small intestines within the mid- and lower-abdominal cavity permit displacement at the time of implantation. When implanted in the lower abdominal cavity, pneumatic power conduits can be passed through the diaphragm into the thoracic cavity and connected to the blood pump located there. The blood pump is one which is preferably operated by pneumatic pressure, with the gas pressure being approximately equal to the blood pressure. Application of an appropriate coating as a base layer of polyether polyurethane followed by a layer of a suitable silicone polymer such as medical grade Silastic to the Stirling engine minimizes the compatibility problem between the surface material of the implanted engine and the surrounding tissues. Silastic is generally compatible with body tissues but is relatively pervious to body saline solutions. The polyurethane layer prevents diffusion of body fluids through the coating to the alloy outer housing and cap of the engine. Both of these plastic materials are capable of withstanding sufficiently high temperatures during autoclave sterilization prior to surgical implant of the engine.

The heat exchanger in its most practical configuration is a coiled tubing suitably attached for good heat transfer to the housing cap on the upper or external surface of the cold wall thereof. The heat exchanger includes, for example, a length of stainless steel tubing with a thin inner liner of Teflon or Silastic. Good thermal contact must, of course, be maintained between the tubing and inner liner during fabrication. There are two distinct temperature changes which occur in the blood flowing through a simple tubing heat exchanger. The first is the rise in overall average or bulk fluid temperature (maximum permissible rise is 4° C., for example), and the second is the boundary layer temperature drop which occurs at the interface between the heat exchanger tubing wall and the blood (temperature at interface must not exceed 43° C.).

Blood can be diverted either from the descending aorta in the region of the posterior bifurcation or from the external iliac artery to the heat exchanger. Overall tubing length is limited by the available space of the surface area on the housing cap associated with the cold wall of the engine. However, 25 watts can be easily rejected by blood diverted directly from the descending aorta through the heat exchanger tubing, and 15 watts by the diversion of blood from the external iliac artery, for example, with an overall tubing length of between 12 and 24 inches and of an adequate diameter. The heat exchanger can, of course, be made to be integral with the power source (Stirling engine) by suitable further design.

Blood has been shown to be a non-Newtonian fluid. Its viscosity decreases with increasing rate of shear or velocity gradient across the cylindrical tubing. The flow of blood tends to deviate significantly from Poiseuille's law, and blood does not flow as a homogeneous fluid in the tubing. The plasma itself behaves like a Newtonian fluid even though it is a colloidal suspension. Under normal flow conditions, a relatively cell-free region is found near the wall of the tubing with the red blood cells grouping toward the center of the main stream of flow. This behavior has produced viscosity data varying both in the animal from which the blood was obtained and with the temperature at which the viscosity was measured. Turbulence is the greatest contributor of blood damage (hemolysis) and subsequent clot formation. To minimize the hemolysis level produced in the heat exchanger, certain conditions in the heat exchanger cannot be such that a predetermined critical velocity (hence, a critical Reynolds number) is exceeded whereby intolerable hemolysis will occur. The critical point or value of the Reynolds number is dependent upon the diameter of the tubing, the density and viscosity of the fluid (blood), and its mean (average) flow velocity. It is noted that once the heat has been successfully transferred from the engine to the blood stream, no significant perturbations in the physiological heat balance in the associated animal or person would normally occur.

Finally, the control device for regulating engine power output includes an adjustable bypass valve in a passageway which connects the cylinder chamber of the thermodynamic converter to the power outlet housing chamber. The bypass valve can be adjusted to regulate the pressure difference appearing across the drive plug to control engine speed and, hence, its power output. The power outlet housing can be directly connected to drive a diaphragm-type blood pump, and a close coupling thus exists between the engine and pump. The blood pump volume and the volume of the region between the opening in the cold wall of the engine cylinder are complementary. As blood is expelled from the blood pump, the gas region volume increases and as blood is drawn into the blood pump, the gas region volume decreases. The resulting pressure changes across the opening and on the drive plug causes oscillation of the regenerator and continuous operation of the engine.

Below a minimum stroke length determined by the dimensions of the cold wall opening and drive plug, insufficient energy is supplied to the regenerator by the opening and plug arrangement to maintain the regenerator in motion. Above this minimum stroke length, as the demand output increases, the thermodynamic efficiency of the engine increases. Simultaneously, the stroke length and frequency required to obtain the demanded output also increase. Howevr, at a point corresponding to full stroke, further increases in output are obtained only at the cost of rapidly increasing frequency and decreasing efficiency. Only a relatively small increase in useful work is obtained at frequencies above that correspondnig to the full stroke point, and there is little reason to operate the engine at such higher frequencies. Thermodynamic efficiency is, of course, defined as the ratio of power (or work) output to power (or energy) input.

One of the major characteristics of the body's aortic pressure is that a rapid pressure increase (as blood is pumped from the heart) is followed by a slower decrease (as blood leaves the aorta and flows through the body). The typical aorta pressure pulse configuration indicates that aortic pressure is proportional to the amount of blood in the aorta, and that the blood flows out of the aorta at a rate which is nearly proportional to the difference between pumping and aorta pressures. In addition, blood flows into the aorta from the heart (or pump) whenever its aorta valve is open. The diaphragm-type blood pump which is driven by the Stirling engine can be suitably connected to the aorta, for example. The engine can be regulated by adjustment of the bypass control valve to vary the frequency and stroke length of the regenerator. The amount of heat rejected per cycle stays nearly constant in the engine but the output work per cycle increases with increased frequency until full stroke is reached. This behavior is largely the result of the time-dependent nature of the opposing aorta pressure since, as pump frequency increases, the average outlet pressure against which it is working increases with it. While the ratio of output in liters/minute to the input heat, or of volume/cycle to heat/cycle drops with increasing frequency, the output or work performed by the engine increases because entirely of an increase in the pressure range and not an increase in the volume range.

BRIEF DESCRIPTION OF THE DRAWINGS

Our invention will be more fully understood, and other features and advantages thereof will become apparent, from the following description of an exemplary embodiment of the invention. The description is to be taken in conjunction with the accompanying drawings, in which:

FIG. 1 is an elevational and partially sectional perspective view of an implantable radioisotope-fueled Stirling engine constructed according to this invention;

FIG. 2 is a fragmentary and diagrammatic drawing showing the Stirling engine power source implanted in a person, with isodose lines (sum of gamma and neutron contributions) indicated thereon;

FIG. 4 is a top plan view of the Stirling engine;

FIG. 6 is a fragmentary sectional view of the Stirling engine as taken along the line 6—6 indicated in FIG. 4;

FIG. 7 is a generally cross sectional view of the Stirling engine as taken along the line 7—7 indicated in FIG. 5;

FIG. 8 is another cross sectional view of the Stirling engine as taken along the line 8—8 indicated in FIG. 5;

FIG. 10 is a fragmentary and enlarged view of the portion enclosed by the line 10—10 indicated in FIG. 5 and showing the fail-safe, emergency heat dumping device used in the Stirling engine;

FIG. 11 is a top plan view of the regenerator used in the Stirling engine;

FIG. 12 is a sectional view of the regenerator as taken along the line 12—12 indicated in FIG. 11;

FIG. 13 is a fragmentary and enlarged view of the portion enclosed by the line 13—13 indicated in FIG. 12 and showing the upper corner construction of the regenerator;

FIG. 14 is an elevational view of the regenerator upper corner construction as taken along the line 14—14 indicated in FIG. 13;

FIG. 15 is a fragmentary and elevational view of one of the diametrically opposite pair of counter-weighted linkages of the Sarrut's type linkage system supporting the regenerator;

FIG. 16 is a partially sectional view of the counter-weighted linkage as taken along the line 16—16 indicated in FIG. 15;

FIG. 17 is a fragmentary view of the counterweighted linkage as taken along the line 17—17 indicated in FIG. 15;

FIG. 19 is a fragmentary and sectional view of an alternate main pivot shaft (using jeweled bearings) for the counterweighted linkage shown in FIGS. 15 and 16;

FIG. 20 is a fragmentary and sectional view of the secondary pivot shaft which is used for the center and lower hinge joints of the pair of counterweighted linkages and of the pair of stabilizing linkages located between the counterweighted linkages;

FIG. 21 is a fragmentary elevational view of one of the diametrically opposite pair of stabilizing linkages of the Sarrut's type of linkage system supporting the regenerator;

FIG. 22 is a fragmentary elevational view of the stabilizing linkage as taken along the line 22—22 indicated in FIG. 21;

FIG. 23 is a sectional view of the drive plug assembly which is secured to the center of the upper portion of the regenerator;

FIG. 24 is an elevational and partially sectional view of the thermal storage component surrounding a radioisotope fuel capsule to provide the radioisotopic heat source for the Stirling engine;

FIG. 25 is a cross sectional view of the thermal storage component and its fuel capsule as taken along the line 25—25 indicated in FIG. 24;

DESCRIPTION OF THE PRESENT EMBODIMENT

Figures 3A, 3B:
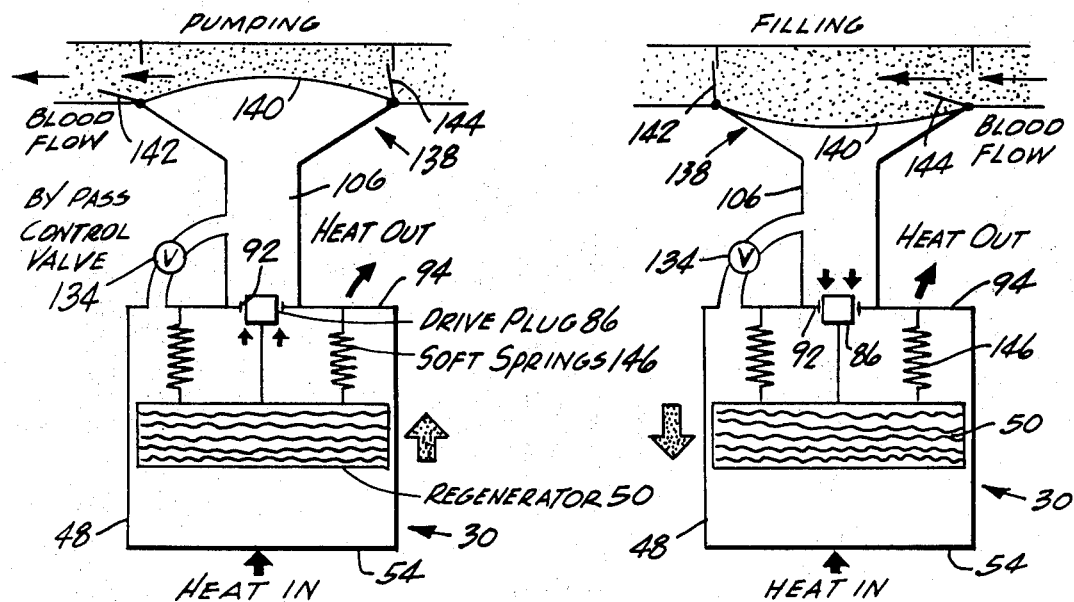
FIGS. 3A and 3B are diagrammatic drawings which show the Stirling engine coupled directly to a diaphragm-type blood pump and respectively illustrate the pumping and filling action of the pump as driven by the engine.

FIG. 1 is an elevational perspective view of an illustrative embodiment of our invention. Approximately a quarter section of the implantable radioisotope-fueled Stirling engine or power source 30 has been cut away to reveal its internal construction. The incompatibility minimizing coating which normally encapsulates the engine has been omitted from this figure for clarity of illustration. The Stirling engine 30 includes a radioisotopic heat source 32, a thermal storage component 34 for use with the heat source 32, a thermodynamic converter 36 for converting the heat energy into a suitable form of mechanical energy to drive a diaphragm-type blood pump, a heat exchanger system 38 using circulating blood to remove engine waste heat, and an adjustable control system 40 for regulating engine power output. The engine 30 has an overall length of 18.4 centimeters (7.250 inches) and a maximum diameter of 13.0 cm. (5.125 in.), for example. It occupies a volume of approximately 1.8 liters and weighs about 2.5 kilograms. The engine is capable of supplying from 1.5 up to at least 7 watts of mechanical output power. It is also capable of operating in any orientation and is able to survive acceleration loads of at least ±3 gravity units in any direction.

The radioisotopic heat source 32 is a nominally constant temperature device and includes a pear-shaped fuel capsule 42 which encloses a radioisotope fuel pellet 44, and the thermal storage component 34 which surrounds the fuel capsule 42 has compartments that are nearly filled with material 46 having a high latent heat of fusion and an appropriate melting point. A sufficient quantity of the material 46 is provided whereby an adequate amount of mechanical energy can be stored during periods of relatively low acivity to meet the needs for normal daily activity of a person, or supply added energy during peak demand periods. Approximately 7.6 watt-hours of mechanical energy are required or used for normal daily activity. With a nominal overall system efficiency of, for example, 17.3%, the thermal storage capacity of the storage component 34 must be 43.9 watt-hours or 37,800 calories. Where the material 46 is LiH, 62 grams are needed to supply this amount of heat by fusion. The storage component 34 for the exemplary engine 30 can contain 100 grams of LiH with 5% extra volume allowed for expansion above its melting point of 1252°F.

The thermodynamic converter 36 includes a cylinder 48 which houses a disc-shaped regenerator 50 that is supported by a Sarrut's type, counterweighted and spring-augmented linkage system 52. The cylinder 48 is made of zirconia, for example, and a hot wall 54 closes the lower end of the cylinder. The hot wall 54 is formed from the flat upper surface 56 of the hemispherical storage component 34 and a cover disc 58 affixed on top of fuel capsule 42 to be flush with the surface 56. The regenerator 50 includes, for example, a sintered gold wire matrix 60 which is generally sandwiched between upper and lower orifice plates 62 and 64 that are respectively spaced from the upper and lower face surfaces of the matrix 60 to form plenum chambers 66 and 68. The Sarrut's type linkage system 52 provides support and guidance for the regenerator 50, and also counterbalances the weight of the regenerator. Its advantage is that it produces an exact straight-line motion for the regenerator 50. With proper initial alignment and bearing preload to remove bearing play, the regenerator 50 reciprocates linearly within the cylinder 48 and maintains a close clearance without contacting the side walls thereof, provided that structural deflections resulting from gravity and shock loading are not excessive.

The linkage system 52 includes two pairs of linkages 70 and 72. The system 52 is dynamically balanced at any stroke position or operational frequency with no resultant forces on the engine 30 structure. The diametrically opposite linkages of each pair are positioned on diameters which are perpendicular to each other. The linkages 70 have counterweights 74 (and oscillation springs which are shown and described later) thereon, and the linkages 72 provide structural and kinematic stability to the regenerator 50. Only one linkage of each of the pairs of counterweighted linkages 70 and stabilizing linkages 72 are visibly shown in the perspective view of FIG. 1. Each of the counterweighted linkages 70 has upper and lower links 76 and 78 hinged to each other at the knee of the linkage. The links 76 and 78 are of equal length to provide neutral static balance in all positions of the supported regenerator 50. The upper and lower links 80 and 82 of each of the stabilizing linkages 72 are of unequal lengths and fold flat when the regenerator 50 is in its uppermost position. The stabilizing linkages 72 are prevented from locking on dead center in the folded position by a light torsion spring (shown and described later) at each knee of the stabilizing linkages. The counterweighted linkages 70 do not fold completely flat to avoid excessive loads in their lower links 78. Both pair of linkages resist loads applied normally to the longitudinal axis of the cylinder 48. The links 76, 78, 80 and 82 are preferably beryllium forgings which provide maximum rigidity and minimum weight.

The regenerator drive system includes a drive plug assembly 84 which is essentially a disc-shaped drive plug 86 mounted to one end of an axially telescoping structure 88, the other end of which is secured to the center of the regenerator 50 at the top thereof thereof. The telescoping structure 88 is normally held extended by a rebound compression spring 90. The drive plug 86 passes through an opening or passageway 92 in the center of a cold wall 94 which is part of the housing cap 96 of the Stirling engine 30. The housing cap 96 closes the upper end of the cylinder 48 and is suitably formed to provide arcuate chambers 98 and 100 which house and accommodate the movement of the counterweights 74. The main pivot shafts 102 and 104 of the counterweighted linkages 70 and of the stabilizing linkages 72, respectively, are suitably mounted to structure of the housing cap 96. A power outlet housing 106 is also a part of the housing cap 96, and the opening 92 in the cold wall 94 connects the cylinder 48 chamber to that of the outlet housing 106. A heat exchanger 108 includes an appropriate length of coiled and inner Silastic-lined tubing 110 which is suitably attached for good heat transfer to the housing cap 96 on the upper or external surface of the cold wall 94 portion thereof. Blood is circulated through tubing 110 and serves as the cooling medium for removing engine waste heat. The power outlet housing 106 is, of course, suitably coupled to a diaphragm-type blood pump.

The thermal storage component 34 surrounding the fuel capsule 42 is held in a hemispherical shell or dome 112 which is attached to the lower end of the cylinder 48. A fail-safe, emergency heat dumping device 114 connects the storage component 34 through the dome 112 into the insulation space between the dome and an outer housing 116. The cylinder 48 is circumferentially encased by a bellows 118 to avoid full operating pressure across the cylinder, and the space between the outer housing 116 and the dome 112 and bellows 118 is installed with super-insualtion 120. A very small port 122 extending through the cylinder 48 wall maintains the pressure level within the space encased by the bellows 118 essentially at nominal (average) working pressure of the Stirling engine 30. The cylinder 48 and the spaces connecting therewith are filled with a working gas such as xenon, for example. The upper ends of the bellows 118 and outer housing 116 are joined by a closing bulkhead 124 to close the insulation space between the dome 112 and outer housing 116. A lower flange 126 of the housing cap 96 engages the upper end of the cylinder 48 and the bulkhead 124 to close and seal the cylinder chamber and the space encased by the bellows 118, when the housing cap is secured to the bulkhead by nuts 128 tightened on the threaded studs 130.

A control device 132 for regulating engine power output includes an adjustable butterfly bypass valve 134 located in a passageway 136 connecting the chamber of cylinder 48 to that of the power outlet housing 106. The bypass valve 134 can be preadjusted or be continuously adjusted by any suitable control means (not shown) to regulate the pressure difference appearing across the drive plug 86 to control engine speed (and stroke length) and, therefore, its power output.

FIG. 2 is a fragmentary and diagrammatic drawing showing the Stirling engine 30 implanted in the lower abdominal cavity of a man 5 feet 11 inches tall and weighing 180 pounds, for example. Isodose lines (sum of gamma and neutron radiation contributions) are indicated both inside and at the exterior of the body. This isodose data is illustratively based upon a 15-watt fuel capsule 42 containing a medical grade $^{238}PuO_2$ (0.1 p.p.m. $Pu^{236}$, $O^{16}$) fuel pellet isotope encased in refractory alloys (types Ta–10W and T–111) of 0.86 cm. total thickness surrounding it. The dose rates in mr./hr. (millirem per hour) are indicated in solid lines for time of implant and in broken lines for 5 years later. The dose rate is slightly higher 5 years later because, as is well known, $^{238}PuO_2$ cannot be presently obtained commercially in pure form and the medical grade contains fractions of other plutonium isotopes which each decay in a chain process to produce certain other dose-contributing products. Only a very small portion of the body receives a dose rate in excess of 10 mr./hr., and radiation levels are feasible in and around the person. Gamma ray dose rate can be substantially reduced with appropriate metal shielding; however, the neutron dose rate cannot be effectively reduced with shielding.

FIGS. 3A and 3B are diagrammatic drawings which show the Stirling engine 30 coupled directly to a diaphragm-type blood pump 138. The regenerator 50 is the vital moving component of the engine 30 and serves to heat and cool the working gas alternately, as well as to provide a near-perfect insulator between the hot and cold gas spaces in the engine cylinder 48. When the regenerator 50 moves toward the cold wall 94 as indicated in FIG. 3A, the displaced gas is heated by the regenerator 50 and the engine cylinder 48 then becomes filled with hot gas. The resulting higher pressure distends the diaphragm 140 upwardly and forces blood to flow out of the pump 138 through the outlet check valve 142. On reversing its motion, the regenerator 50 moves toward the hot wall 54 as indicated in FIG. 3B. When the regenerator 50 is near the hot wall 54, the engine cylinder 48 is filled with cold gas. The resulting low pressure causes the diaphragm 140 to be distended downwardly and draws blood into the blood pump 138 through the inlet check valve 144.

Engine 30 operation is achieved by the maintenance of a small pressure difference across the drive plug 86 when the regenerator 50 is near midstroke position. The plug 86 then enters opening 92 in the cold wall 94 and momentarily separates the working gas in the engine cylinder 48 from the gas in the pump 138 and its coupling connection (power outlet housing) 106. The pressure on the pump 138 side remains nearly constant but the pressure in the engine cylinder 48 changes continuously with regenerator 50 and plug 86 motion. The resultant pressure difference acts on the plug 86 in such a manner that regenerator motion is appropriately reinforced. This reinforcement provides sufficient energy to overcome friction and regenerator windage. Soft springs 146 act to return the regenerator 50 to its midstroke position. A bypass valve 134 can be adjusted to regulate the pressure difference appearing across the plug 86 and can be preset or varied in position to control the engine speed (regenerator frequency) and, therefore, the power output of the engine 30.

FIG. 4 is a top plan view of the Stirling engine 30. The outer housing 116 is circular in configuration in this view, and it can be seen that the housing cap 96 is secured to the lower part of the engine 30 by nuts 128 which engage the threaded studs 130. The heat exchanger tubing 110 is spirally formed around the power outlet housing 106 which is elongated to provide a connection end to the blood pump 138 in the thoracic cavity. The housing cap 96 includes the counterweight chambers 98 and 100 which are in the upraised portions of the housing cap. The ends of the tubing 110 are, of course, suitably connected to the aorta in the region of the posterior bifurcation or to the external iliac artery.

Figures 5, 9:
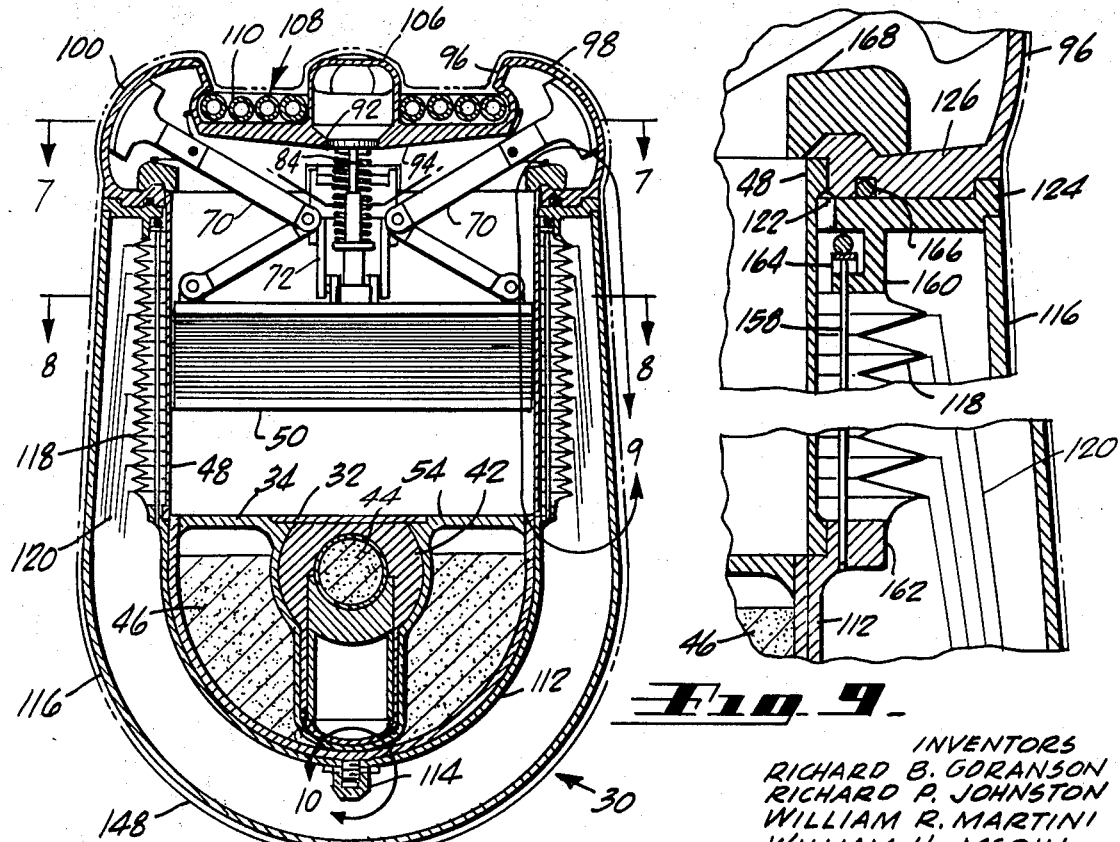
FIG. 5 is a sectional view of the Stirling engine as taken along the line 5—5 indicated in FIG. 4.
FIG. 9 is a fragmentary and enlarged view of the portion enclosed by the line 9—9 indicated in FIG. 5 and illustrating the engine cylinder side wall with its encasing bellows.

FIG. 5 is a sectional view of the Stirling engine 30 as taken along the line 5—5 indicated in FIG. 4. This view has been somewhat simplified for clarity of illustration. The engine 30 is normally covered with a coating 148 to provide compatibility between the implanted engine and the surrounding tissues. The heat exchanger tubing 110 is installed in good heat transfer contact on the exterior surface of cold wall 94 which is part of the housing cap 96. The regenerator 50 is contained within the engine cylinder 48 and is supported by the pair of counterweighted linkages 70 and the pair of stabilizing linkages 72. Drive plug assembly 84 is attached to the center of regenerator 50. The cylinder 48 is encased by bellows 118 and surrounded by superinsulation 120 which is contained by the outer housing 116. The hot wall 54 of the heat source 32 and its thermal storage component 34 closes the lower end of the cylinder 48 and is held in the hemispherical shell or dome 112. The fuel capsule 42 has a fail-safe, heat dumping device 114 which extends through the dome 112 into the superinsulation 120 within the outer housing 116.

FIG. 6 is a fragmentary sectional view of the upper portion of the Stirling engine 30 as taken along the line 6—6 indicated in FIG. 4. The pair of stabilizing linkages 72 is fully shown in this view. The adjustable butterfly bypass valve 134 is located in the bypass passageway 136 which connects the cylinder 48 chamber with that of the power outlet housing 106. The telescoping structure 88 is shown held in its extended condition by rebound spring 90.

FIG. 7 is a generally cross sectional view of the Stirling engine 30 as taken along the routed line 7—7 indicated in FIG. 5. The main pivot shafts 102 for the counterweighted linkages 70 are mounted to side walls of the chambers 98 and 100, and the main pivot shafts 104 for the stabilizing linkages 72 are mounted to the side walls of the chambers 150 and 152. The latter chambers 150 and 152 are located on a diameter which is at right angles to the diameter on which the former chambers 98 and 100 are located.

FIG. 8 is a cross sectional view of the Stirling engine 30 as taken along the line 8—8 indicated in FIG. 5. The orifice pattern of the orifice plate 62 (and of plate 64) is clearly shown in this view. Two sets of lugs 154 and 156 affixed to the orifice plate 62 are adapted to connect with the lower ends of the linkages 70 and 72, respectively. The bellows 118 is concentric with the outer housing 116 and has a number of tension rods 158 positioned circumferentially around and extending longitudinally through the bellows.

FIG. 9 is a fragmentary and enlarged view of the portion enclosed by the line 9—9 indicated in FIG. 5. The bellows 118 is attached at its upper end to a dependent flange 160 of the closing bulkhead 124, and at its lower end to flange 162 of the dome 112. Each of the tension rods 158 engages a tensioning spring 164 at its upper end with the flange 160 and engages the flange 162 at its lower end. The housing cap flange 126 engages the bulkhead 124 and the upper end of the cylinder 48, and is secured to the bulkhead. An O-ring seal 166 is provided between the flange 126 and bulkhead 124 as illustrated. A filler block 168 is positioned over the radially inner ends of the flange 126 and cylinder 48, and the very small port 122 connects the cylinder chamber with the bellows 118 space.

FIG. 10 is a fragmentary and enlarged view of the fail-safe, heat dumping device 114 indicated in the portion enclosed by the line 10—10 of FIG. 5. A stud 170 integral with the lower end of the thermal storage component 34 extends through dome 112 into the superinsulation 120. A washer 172 of, for example, brass (Cu 65, Pb 0.5 and Zn 34.5) is brazed to the bottom of the dome 112 about the stud 170, and a sealed cap nut 174 is threaded onto the stud and then brazed to the copper alloy washer 172. During a normal sleep period, the material 46 of the thermal storage component 34 (FIG. 5) is melted to absorb the excess heat from the fuel capsule 42 and, during the normal waking period, the greater energy requirements can draw on the stored heat to supplement the heat output from the heat source 32. For periods of prolonged bed rest, the thermal storage component 34 will become saturated and its temperature will rise. However, as the temperature increases, losses through conduction and radiation also increase so that the maximum temperature the component 34 will reach, while operating, is about 787° C. The heat exchanger 108 is quite adequate for this, and prolonged bed rest does not pose a problem.

But, if the engine 30 stops as the result of an accident, the possibility of melt-down of the feel capsule 42 must not occur. The maximum equilibrium temperature the heat source 32 will reach is about 880° C., where the heat sink temperature is approximately 49° C. There will be no blood flow through the heat exchanger 108 and the heat sink temperature would rise with a resulting increase in temperature of the heat source 32. Control of temperature is achieved by the melting of the copper alloy washer 172 which is designed to melt at about 910° C. Melting of the washer 172 broaches the containment of the superinsulation to permit the admission of the working gas from the engine 30. The gas discharge path is from the lower corner edges (FIG. 5) of the cylinder 48 chamber down the small spaces between the radially outer and inner surfaces of the thermal storage component 34 and dome 112, respectively, then down the clearance space (FIG. 10) between the stud 170 and its passage hole in dome 112, and out through the melted washer 172 space into the superinsulation 120. With this improved heat path, the temperature of the heat source 32 will drop to less than 715° C. and equilibrium is reached as the body fluids boil away.

FIGS. 11, 12, 13 and 14, together, illustrate the regenerator 50 in detail. FIG. 11 is a top plan view of the regenerator 50 with its upper orifice plate 62 broken partially away to reveal the surface of the matrix 60 and its reinforcing channels 176. The orifice plates 62 and 64 are made of 0.002 inch thick gold sheets, and the orifices 178 are 0.25 inch long by 0.10 wide, for example. FIG. 12 is a sectional view of the regenerator 50 as taken along the line 12—12 indicated in FIG. 11. The attachment hub 180 for the drive plug assembly 84 (FIG. 5) is shown attached directly to the matrix 60. The regenerator 50 is 3.375 inches in diameter and 1.0 inch thick in this example. The matrix 60 can be made of 0.5 mil gold wire (sintered) with a packing density of 1% and the reinforcing truss wires 182 can be made of 0.01 inch diameter, type René 41 alloy. FIG. 13 shows the corner detail encircled by the line 13—13 in FIG. 12. The plenum chamber 66 is 0.10 inch thick and the reinforcing channels 176 are made of 0.002 inch gold sheet. FIG. 14 is a fragmentary and sectional view of the detail shown in FIG. 13 as taken along the line 14—14. Another reinforcing channel 176 is shown positioned at right angles to the one in FIG. 13, to provide suitable structural strength to the plenum chamber 66.

FIGS. 15, 16 and 17, together, illustrate the counterweighted linkages 70 in detail. FIG. 15 is a fragmentary and elevational view of one of the counterweighted linkages 70 shown mounted on its main pivot shaft 102, and attached to the set of lugs 154 on the regenerator 50 through lower pivot shaft 184. The upper link 76 is connected to the lower link 78 by the center pivot shaft 186. The counterweight 74 is fabricated from depleted uranium, for example. FIG. 16 is a fragmentary and sectional view of the linkage 70 as taken along the line 16—16 indicated in FIG. 15. Two oscillation springs 188 and 190 with different torsional rates are mounted on the main pivot shaft 102 of each of the counterweighted linkages 70. Spring 188 is engaged when the regenerator 50 is on one side of midstroke position, and spring 190 is engaged when the regenerator is on the other side of midstroke position. This approximates harmonic motion at the engine centerline because the mass seen at the main pivot shaft (and likewise at the engine centerline) varies with regenerator 50 position in the cylinder 48. FIG. 17 is a fragmentary view of the linkage 70 as taken along the line 17—17 indicated in FIG. 15. It can be seen that the free end of spring 188 is located below the counterweight 74 stem portion in this view, and the free end of spring 190 extends through opening 191 in the upper link 76 and is located above the counterweight stem position.

Figure 18:
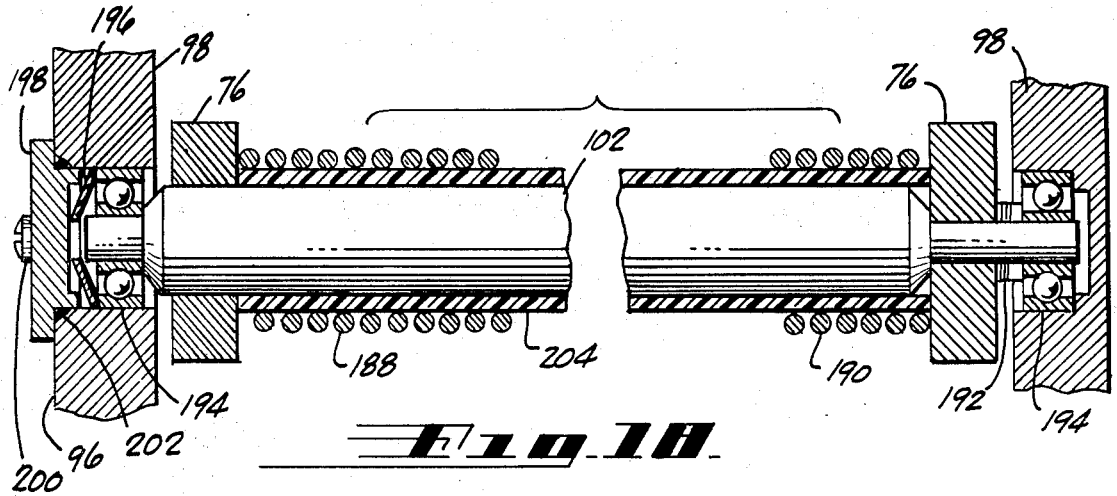
FIG. 18 is a fragmentary and sectional view of the main pivot shaft for the counterweighted linkage shown in FIGS. 15 and 16.

FIG. 18 is a fragmentary sectional view of one of the main pivot shafts 102 for the counterweighted linkages 70. Lateral alignment of the upper link 76 (and the linkage 70) is established by the shim pack 192. A thrust preload on the bearings 194 is maintained by a (Belleville) spring washer 196 at one end of the main pivot shaft 102. The end cap 198 secured to the housing cap 96 structure by screws 200, and seal 202 seals the left shaft bearing 194 and supports the preload applied by the spring washer 196. A (Teflon) sleeve 204 positioned between the oscillation springs 188 and 190 and shaft 102 prevents fretting, corrosion and fatigue of the parts. The bearings 194 are, for example, miniature precision instrument type units. Because the loads are light and engine speed is relatively low, dry lubricant is used to prevent seizing. The shaft 102 is fitted to the bearings 194 and dry-lubricated so that the shaft will turn in the inner race if a bearing fails, and the engine 30 will continue to function for a sufficient time for replacement of the engine to be made.

FIG. 19 is a fragmentary sectional view of an alternate configuration for the main pivot shafts 102. The oscillation springs 188 and 190, and the sleeve 204, have been omitted from this view for clarity of illustration. The shaft 102, in this instance, has spherical (tungsten carbide) pivot ends 206 which are journaled in sapphire jewels 208 and end stones 210. Jewel cushions 212 are positioned behind the end stones 210 and the jewel bearings are carried in cups 214. A retaining ring 216 is positioned in the channel 218 in the shaft 102, and a (Belleville) spring washer 220 engages a shoulder 222 on the other end of the shaft to maintain lateral alignment thereof. A shim pack 224 is located in back of the right cup 214. It is noted that the main pivot shafts 104 (FIGS. 6 and 7) for the stabilizing linkages 72 can be similar to the shafts 102 except for the omission of the oscillatory springs 188 and 190 therefrom.

FIG. 20 is a fragmentary and sectional view of either the lower or center pivot shafts 184 or 186 of the counterweighted linkages 70. The same configuration can be used for the lower and center pivot shafts of the stabilizing linkages 72. The lower pivot shaft 184 has its ends journaled in bearings 226 and 228 installed in the lower links 78. The bearing 226 is laterally restrained by retainer ring 230 and the bearing 228 by its flange 232. A split bushing 234 engages a channel 236 in the shaft 184 and is secured thereto by lock ring 238. Shim pack 240 is provided between the bushing 234 end and the right lug 154 for lateral adjustment of the shaft 184. The (Belleville) spring washer 242 maintains a lateral load on the bearing 228.

FIGS. 21 and 22, together, illustrate the structure of the stabilizing linkages 72. FIG. 21 is a fragmentary and elevational view of one of the linkages 72. The upper link 80 of a linkage 72 is connected to the main pivot shaft 104, and the lower link 82 is connected to the lugs 156 of regenerator 50 through the lower pivot shaft 244. The upper and lower links 80 and 82 are jointed by a center pivot shaft 246. Rebound torsion spring 248 is provided to arrest the motion of the regenerator 50 as it approaches the hot wall 54 (FIG. 5) of the cylinder 48. FIG. 22 is a fragmentary and partially sectional view of the linkage 72 as taken along the line 22—22 indicated in FIG. 21. Housing cap 96 structure is shown fragmentarily to illustrate the connection of the shaft 104 therewith. The free end of the rebound spring 248 engages the housing cap 96 structure when the regenerator 50 approaches the hot wall 54. A light torsion spring 250 on the center pivot shaft 246 prevents the linkage 72 from locking on dead center in the folded position.

FIG. 23 is a fragmentary elevational view of the drive plug assembly 84. The telescoping structure 88 includes a tubular support base 252 which is attached to the hub 180 on the regenerator 50. A telescoping rod 254 mounts the drive plug 86 on its upper end, and is held in the extended position by rebound compression spring 90. The lower end of spring 90 engages flanges 256 of the base 252, and its upper end engages the lower recessed area 258 of the plug 86. The head 260 at the lower end of rod 254 is limited from moving farther upwards by a shoulder 262 in the base 252. The upper portion of the base 252 is suitably formed to guide the rod 254 for vertical movement. The rebound spring 90 is activated by the plug 86 bottoming against the stop area (inside upper surface) of the power outlet housing 106 (FIG. 5) directly above the opening 92 in the cold wall 94. This compresses the spring 90 and causes the rod 254 to telescope into the base 252. The oscillation springs 188 and 190 (FIG. 16) act at, for example, ±0.6 inch from the midstroke position of the regenerator 50. From ±0.6 to ±1.0 inch, the rebound springs 90 and 248 (FIG. 22) are engaged. The oscillation springs 188 and 190 are designed to produce a natural regenerator 50 movement frequency of 1 Hz. (Hertz), and the rebound springs 90 and 248 are designed for a natural frequency of 3 Hz. at full stroke.

FIG. 24 is an elevational and partially sectional view of the thermal storage component 34 and fuel capsule 42 which are partially broken away to illustrate their internal structure. The pear-shaped fuel capsule 42 includes the spherical fuel pellet 44 (1.80 cm. diameter) which is encapsulated by a liner 264 (0.05 cm. thick Ta–10W alloy). The liner 264 has, for example, four small pressure release plugs (not shown) therein located adjacent to small pressure relief voids between the pellet 44 and liner. The inner container or liner 264 is, in turn, installed in an outer primary shielding container 266 (0.81 cm. thick T–111 alloy) which has a flat upper area 268 and a lower, closing, shielding cover 270. The primary container 266 has a dependent cylindrical collar 272 which is internally lined by a thin, cylindrical, perforated spacer shell 274 (0.05 cm. thick 302SS alloy) and closed by an ellipsoidal end cap 276. Electron beam welding is used to seal the different junctions where required. The lower portion of the fuel capsule 42 provides a plenum chamber 278 (2.6 cm. in length and 2.2 cm. in diameter) which accumulates helium produced by the decay of $^{238}PuO_2$.

The (four) pressure release plugs in the liner 264 are designed to retain the elium within the liner for times greater than one month to allow adequate time for placement of the lined fuel into the capsule 42, performance of the final closure and subsequent leak testing. The fuel capsule 42 is designed to contain 3.03 cc. of $^{238}PuO_2$ and provides a void-to-fuel ratio of 3.5:1, for example. This ratio will result in a helium pressure of 500 p.s.i. at 1270° F. six years after encapsulation in the capsule 42. The helium pressure will be safely below the rupture point for operation at working temperature for as long as 20 years after encapsulation. The fuel capsule 42 is contained in the thermal setorage component 34 and the flat upper area 268 is covered with disc 280 to be flush with the remainder of the storage component. The diameter of the component 34 is, for example, 8.55 cm. and the stud 170 is affixed to the bottom of the component.

FIG. 25 is a cross sectional view of the thermal storage component 34 and its fuel capsule 42 as taken along the line 25—25 indicated in FIG. 24. Webs 282 divide the storage component 34 into compartments 284 which are nearly filled with LiH as the thermal storage material 46. The storage component 34 including the webs 282 are made of molybdenum (Mo). Lithium hydride (LiH) is a loosely bound compound and the hydrogen dissociates at temperatures above 500° C. Only arc-cast pure Mo is sufficiently resistant to the diffusion of hydrogen to permit its use in this application. Of course, Mo is compatible with LiH. However, Mo oxidizes rapidly at temperatures above 540° C. in an oxidizing atmosphere. Accordingly, the surface of the storage component 34 is flame-sprayed with a layer of Al-Cr-Si, for example. It is noted that filling of the LiH into the compartments 284 is conducted in an inert atmosphere using a very dry gas to avoid the inclusion of water with the LiH. This operation is significant because water in LiH converts to LiOH and degrades the thermal storage properties of the LiH. The fuel capsule 42 is also installed in an inert atmosphere to prevent oxidation of the capsule shell and to improve heat transfer.

Figure 26:
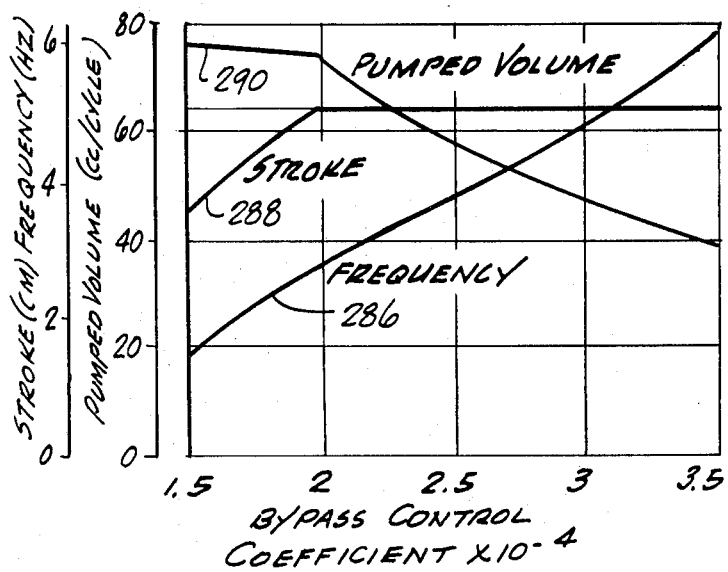
FIG. 26 is a graph including curves which illustrate the effect of bypass control valve (coefficient) variation on regenerator oscillation frequency, stroke length and pumped volume.

FIG. 26 is a graph including curves 286, 288 and 290 which illustrate the effect of bypass control valve 134 on regenerator oscillation frequency, stroke length and pumped volume, respectively, where the Stirling engine 30 is coupled to drive the diaphragm-type blood pump 138 (FIGS. 3A and 3B). The valve effect is described analytically as a variation in bypass control coefficient. It can be seen that excellent controllability of the engine 30 is demonstrated in a wide range of frequencies above 1.5 Hz. Below a stroke of 3.3 cm., insufficient energy is supplied to the regenerator 50 by the drive plug 86 and its cold wall opening 92 arrangement to maintain the regenerator in motion. As the demand output increases, the thermodynamic efficiency of the engine 30 increases. The output work per cycle increases with increased frequency until full stroke is reached. Once the regenerator 50 is moving at full stroke, the output in liters per minute remains essentially constant. The engine 30 is, therefore, normally not operated at a frequency above that corresponding to full stroke.

Figure 27:
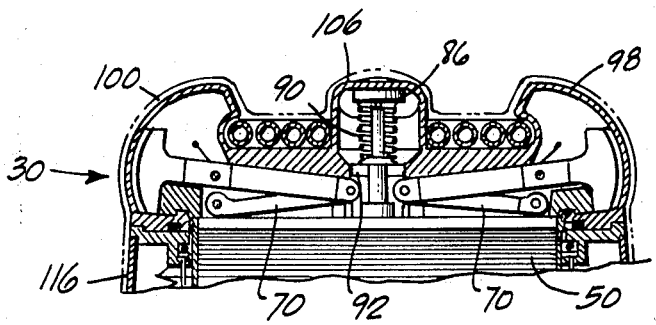
FIG. 27 is a fragmentary sectional view showing the condition of the Sarrut's type linkage system and the drive plug assembly when the regenerator is at its upper limit of travel.
Figure 28:
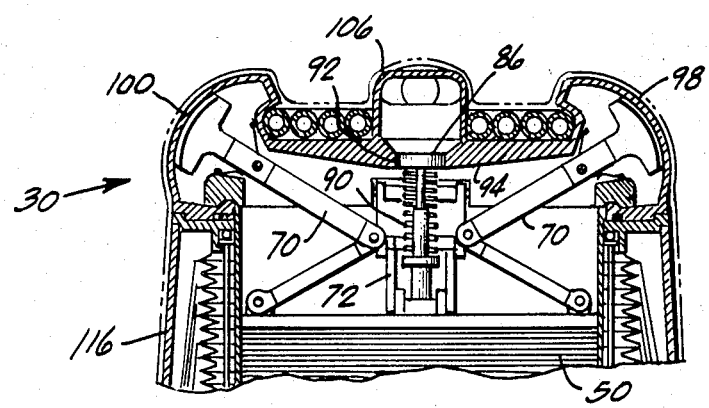
FIG. 28 is a fragmentary sectional view showing the condition of the linkage system and drive plug assembly when the regenerator is at its midstroke position.
Figure 29:
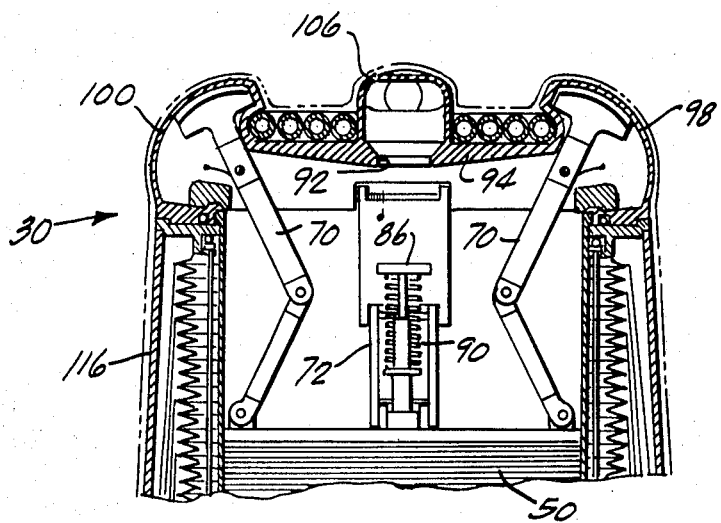
FIG. 29 is a fragmentary sectional view showing the condition of the linkage system and drive plug assembly when the regenerator is at its lower limit of travel.

FIGS. 27, 28 and 29 are fragmentary sectional views of the Stirling engine 30 illustrating successive conditions of the engine in operation. FIG. 27 shows the regenerator 50 at the upper limit of full stroke. The drive plug 86 engages the top of the power outlet housing 106 and the rebound spring 90 is compressed. At the same time, the counterweighted linkages 70 are folded as illustrated. The cylinder 48 is essentially filled with hot working gas. FIG. 28 shows the regenerator 50 at midstroke position. The drive plug 86 is passing through the opening 92 in the cold wall 94 and the drive plug assembly is held in its telescoped condition by the rebound spring 90. The counterweighted and stabilizing linkages 70 and 72 are all sharply bent inwardly as shown. Finally, FIG. 29 shows the regenerator 50 at the lower limit of full stroke. The drive plug 86 has passed into the cylinder 48 chamber and the rebound torsion spring 248 (FIG. 22) is engaged. The cylinder 48 is now essentially filled with cold working gas. The regenerator 50 reverses its movement at this time and begins its upward stroke to reverse and repeat the cycle.

This completes the description of the exemplary embodiment of our invention. While certain dimensions and types of material have been mentioned in the foregoing description, it is to be understood that such dimensions and types of materials were given by way of example only, and are not intended to limit the scope of this invention in any manner. Similarly, it is to be understood that the particular embodiment of our invention as described above and shown in the accompanying drawings are merely illustrative of, and not restrictive on, the broad invention and that various changes in design, structure and arrangement may be made in the disclosed embodiment of our invention without departing from the spirit and scope of the invention.

What is claimed is:

1. A heat power engine comprising:
   a thermodynamic converter for converting heat energy into a form of mechanical energy and operable in any direction, and including a hot wall and a cold wall;
   a relatively long-life heat source for heating said hot wall; and
   a heat exchanger for cooling said cold wall, said converter including a cylinder filled with a working fluid and having said hot and cold walls at opposite ends thereof, a regenerator mounted within said cylinder and adapted to oscillate between said hot and cold walls, means for mounting said regenerator in said cylinder to provide a regenerator support system which is dynamically balanced at any stroke position and operational frequency of said regenerator, and drive means for oscillating said regenerator between said hot and cold walls, said cold wall including an opening therein and a power outlet housing connecting therewith, and said drive means including a drive plug telescopically mounted to said regenerator and biased in an extended condition, whereby when said drive plug moves through said opening into said power outlet housing to engage a part thereof, said drive plug is telescopically withdrawn against its bias to arrest the motion of said regenerator.

2. The invention as defined in claim 1 wherein exterior portions of said heat source and cylinder side walls are insulated with superinsulation having vacuum included therein.

3. A heat power engine comprising:
   a thermodynamic converter for converting heat energy into a form of mechanical energy and operable in any direction, and including a hot wall and a cold wall;
   a relatively long-life heat source for heating said hot wall; and
   a heat exchanger for cooling said cold wall, said converter including a cylinder filled with a working fluid and having said hot and cold walls at opposite ends thereof, a regenerator mounted within said cylinder and adapted to oscillate between said hot and cold walls, means for mounting said regenerator in said cylinder to provide a regenerator support system which is dynamically balanced at any stroke position and operational frequency of said regenerator, and drive means for oscillating said regenerator between said hot and cold walls, and said cylinder being circumferentially encased in bellows means which is pressurally in communication with said cylinder.

4. The invention as defined in claim 3 wherein said heat source includes a radioisotopic fuel capsule and a surrounding thermal storage component.

5. The invention as defined in claim 3 wherein exterior portions of said heat source and bellows means are insulated with superinsulation having vacuum included therein.

6. A heat power engine comprising:
   a thermodynamic converter for converting heat energy into a form of mechanical energy and operable in any direction, and including a hot wall and a cold wall;
   a relatively long-life heat source for heating said hot wall; and
   a heat exchanger for cooling said cold wall, said heat source including a radioisotopic fuel capsule and a surrounding thermal storage component, and said fuel capsule being pear-shaped and including a spherically shaped radioisotope fuel pellet, and a tubular void chamber for receiving any gas generated by the decay of said radioisotope fuel pellet, whereby a minimum weight fuel capsule having proper shielding and an adequate gas accumulation void space is obtained.

7. The invention as defined in claim 6 wherein said thermal storage component contains a material which has a high latent heat of fusion and an appropriate melting tempearture to absorb excess heat from said fuel capsule.

8. The invention as defined in claim 7 wherein said material includes an eutectic mixture of lithium fluoride and sodium fluoride.

9. A heat power engine comprising:
   a thermodynamic converter for converting heat energy into a form of mechanical energy and operable in any direction, and including a hot wall and a cold wall;

a relatively long-life heat source for heating said hot wall;

a heat exchanger for cooling said cold wall, said converter including a cylinder filled with a working fluid and having said hot and cold walls at opposite ends thereof, a regenerator mounted within said cylinder and adapted to oscillate between said hot and cold walls, means for mounting said regenerator in said cylinder to provide a regenerator support system which is dynamically balanced at any stroke position and operational frequency of said regenerator, and drive means for oscillating said regenerator between said hot and cold walls, and wherein exterior portions of said heat source and cylinder side walls are insulated with superinsulation having vacuum included therein; and a fail-safe, heat dumping device connecting said heat source to said superinsulation.

10. The invention as defined in claim 9 wherein said heat exchanger uses blood as a cooling medium and includes a length of tubing having an inner surface material which is compatible with blood.

References Cited

UNITED STATES PATENTS

| | | | |
|---|---|---|---|
| 3,080,706 | 3/1963 | Flynn et al. | 62—6X |
| 3,224,187 | 12/1965 | Breihan | 60—24 |
| 3,319,416 | 5/1967 | Renshaw | 60—24 |
| 3,379,191 | 4/1968 | Harvey | 3—1X |
| 3,400,281 | 9/1968 | Malik | 60—24X |
| 3,405,521 | 10/1968 | Kelly | 60—24 |
| 3,442,079 | 5/1969 | Meijer et al. | 60—24 |

OTHER REFERENCES

"Six-Month Technical Progress Report Study of the Effects of Additional Endogenous Heat," pp. II–130, 131. Author—Thermoelectron Eng. Co., January 1967.

MARTIN P. SCHWADRON, Primary Examiner

L. J. PAYNE, Assistant Examiner

U.S. Cl. X.R.

3—1; 62—6